(12) United States Patent
Van Berge et al.

(10) Patent No.: US 7,592,289 B2
(45) Date of Patent: Sep. 22, 2009

(54) PROCESS FOR ACTIVATING COBALT CATALYSTS

(75) Inventors: Peter Jacobus Van Berge, Sasolburg (ZA); Jacobus Lucas Visagie, Sasolburg (ZA); Jan Van De Loosdrecht, Sasolburg (ZA); Tjaart Jurgens Van Der Walt, Sasolburg (ZA); Johan Coenraad Sollie, Gouda (NL); Sylvia Sollie-Breur, legal representative, Gouda (NL); Hans Marcel Veltman, Utrecht (NL)

(73) Assignees: Sasol Technology (Proprietary) Limited, Johannesburg (KR); Engelhard De Meern B.V., De Meern (NL)

( * ) Notice: Subject to any disclaimer, the term of this patent is extended or adjusted under 35 U.S.C. 154(b) by 645 days.

(21) Appl. No.: 10/480,778

(22) PCT Filed: Oct. 25, 2002

(86) PCT No.: PCT/IB02/04432

§ 371 (c)(1),
(2), (4) Date: Apr. 11, 2005

(87) PCT Pub. No.: WO03/035257

PCT Pub. Date: May 1, 2003

(65) Prior Publication Data

US 2005/0227866 A1 Oct. 13, 2005

(30) Foreign Application Priority Data

Oct. 25, 2001 (ZA) .................. 2001/8815

(51) Int. Cl.
*B01J 23/00* (2006.01)
*B01J 23/40* (2006.01)
*B01J 23/42* (2006.01)

(52) U.S. Cl. .............. 502/325; 502/326; 502/327; 502/415; 502/439

(58) Field of Classification Search ........... 502/201, 502/260, 325, 326, 327, 415, 439
See application file for complete search history.

(56) References Cited

U.S. PATENT DOCUMENTS 4,399,234 A 8/1983 Beuther et al.

(Continued)

FOREIGN PATENT DOCUMENTS

EP 0152652 8/1985

(Continued)

OTHER PUBLICATIONS

Specification and claims of South African Patent Application 969314, dated Nov. 6, 1996.

(Continued)

*Primary Examiner*—Cam N Nguyen
(74) *Attorney, Agent, or Firm*—Ladas and Parry LLP

(57) ABSTRACT

A particulate pre-reduction cobalt supported Fischer-Tropsch synthesis catalyst precursor which comprises a catalyst support impregnated with cobalt, is treated with a pure hydrogen reducing gas, at a first specific feed gas space velocity, SV1, and at a first heating rate, HR1, to obtain a partially reduced precursor. The support contains reducible cobalt oxide in a calcined state and having a formula-unit in which each mole of cobalt atoms is associated with more than 4/3 moles of oxygen atoms and displaying a reducible cobalt oxide specific surface area at least equal to that of $Co_3O_4$ spinel. The partially reduced precursor is then treated with a pure hydrogen reducing gas, at a second specific feed gas space velocity, SV2, and at a second heating rate, HR2, to obtain an activated supported Fischer-Tropsch catalyst, with SV2≦SV1 and/or HR2≧HR1; however, when SV2=SV1, HR2≠HR1 and when HR2=HR1, SV2≠SV1.

13 Claims, 3 Drawing Sheets

U.S. PATENT DOCUMENTS

| | | | |
|---|---|---|---|
| 4,585,798 A | | 4/1986 | Beuther et al. |
| 4,717,702 A | | 1/1988 | Beuther et al. |
| 4,729,981 A | | 3/1988 | Kobylinski et al. |
| 5,053,574 A | * | 10/1991 | Tsutsui et al. ............... 585/488 |
| 5,168,091 A | | 12/1992 | Behrmann et al. |
| 5,258,411 A | | 11/1993 | Behrmann et al. |
| 5,292,705 A | | 3/1994 | Mitchell |
| 5,389,690 A | | 2/1995 | Mitchell |
| 5,728,918 A | * | 3/1998 | Nay et al. .................... 585/733 |
| 5,733,839 A | | 3/1998 | Espinoza et al. |
| 5,929,126 A | * | 7/1999 | Koveal et al. ............... 518/709 |
| 5,998,328 A | * | 12/1999 | Dawes et al. ................ 502/182 |
| 6,239,184 B1 | * | 5/2001 | Beer et al. ................... 518/709 |
| 6,262,132 B1 | | 7/2001 | Singleton et al. |
| 6,455,462 B2 | * | 9/2002 | van Berge et al. ........... 502/325 |
| 6,486,220 B1 | * | 11/2002 | Wright ........................ 518/709 |
| 6,559,191 B1 | * | 5/2003 | Koveal et al. ............... 518/709 |
| 6,596,781 B1 | * | 7/2003 | Schinski ..................... 518/700 |
| 6,638,889 B1 | * | 10/2003 | Van Berge et al. .......... 502/300 |
| 6,777,451 B2 | * | 8/2004 | Koveal et al. ............... 518/710 |
| 6,800,579 B2 | * | 10/2004 | Daage et al. ................. 502/38 |
| 6,806,226 B2 | * | 10/2004 | Van Berge et al. .......... 502/326 |
| 6,835,690 B2 | * | 12/2004 | Van Berge et al. .......... 502/328 |
| 6,869,978 B2 | * | 3/2005 | Wright et al. ............... 518/709 |
| 6,875,720 B2 | * | 4/2005 | Van Berge et al. .......... 502/103 |
| 6,897,177 B2 | * | 5/2005 | Van Berge et al. .......... 502/185 |
| 6,962,947 B2 | * | 11/2005 | Wright et al. ............... 518/709 |
| 7,012,104 B2 | * | 3/2006 | Espinoza et al. ............. 518/715 |
| 2001/0038814 A1 | * | 11/2001 | Fischer et al. ............ 423/240 S |
| 2003/0144366 A1 | * | 7/2003 | Daage et al. ................. 518/715 |
| 2003/0166451 A1 | * | 9/2003 | Koveal et al. ................. 502/38 |
| 2004/0127585 A1 | * | 7/2004 | Raje ........................... 518/715 |

FOREIGN PATENT DOCUMENTS

| | | |
|---|---|---|
| EP | 0168894 | 1/1986 |
| EP | 0434284 | 6/1991 |
| EP | 0535790 | 4/1993 |
| EP | 0533227 | 4/1996 |
| EP | 0533228 | 11/1996 |
| EP | 0756895 A2 | 2/1997 |
| EP | 0554348 | 6/1998 |
| WO | 92/06784 | 4/1992 |
| WO | 99/34917 | 7/1999 |
| WO | 99/42214 | 8/1999 |
| WO | 99/61550 | 12/1999 |
| WO | 00/20116 | 4/2000 |
| WO | 01/39882 A1 | 6/2001 |
| ZA | 96/9314 | 11/1996 |
| ZA | 2000/5666 | 10/2000 |
| ZA | 2001/4504 | 5/2001 |

OTHER PUBLICATIONS

Xu, Z. P. and H. C. Zeng. "Control of Surface Area and Porosity of $Co_3O_4$ via Intercalation of Oxidative or Nonoxidative Anions in Hydrotalcite-like Precursors", *Chem. Mater.* (2000), 12: 3459-3465.

Karri, S. B. Reddy. "A Unifying Phase Diagram for Regimes of Fluidization", *Particulate Solid Research, Inc. (P.R.S.I.) Research Brief-13 162*, Oct. 25, 1988, pp. 1-19.

Specification of South African Patent Application 2001/4504, dated May 31, 2001.

Specification and claims of South African Patent Application 2000/5666, dated Oct. 13, 2000.

* cited by examiner

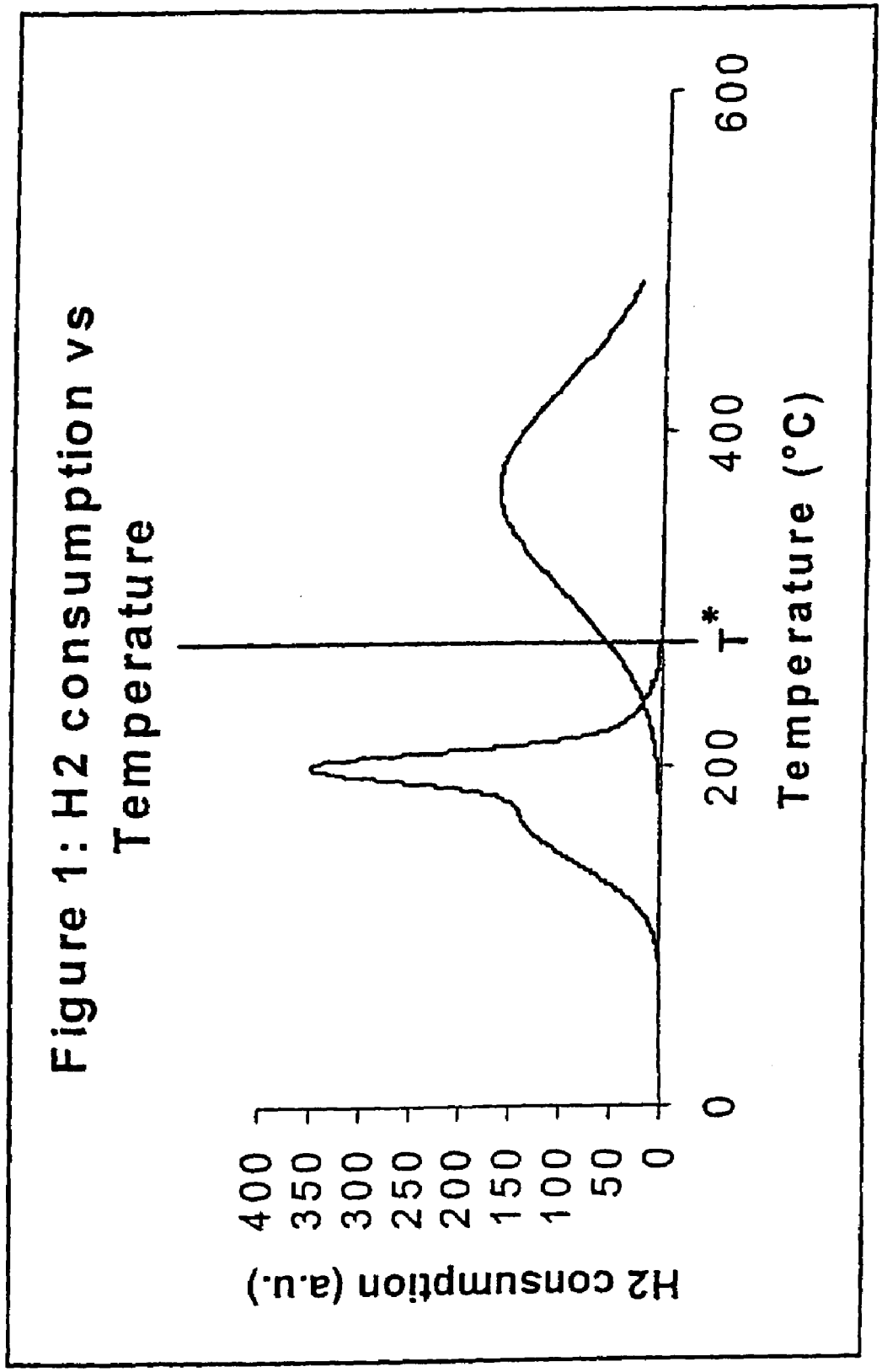

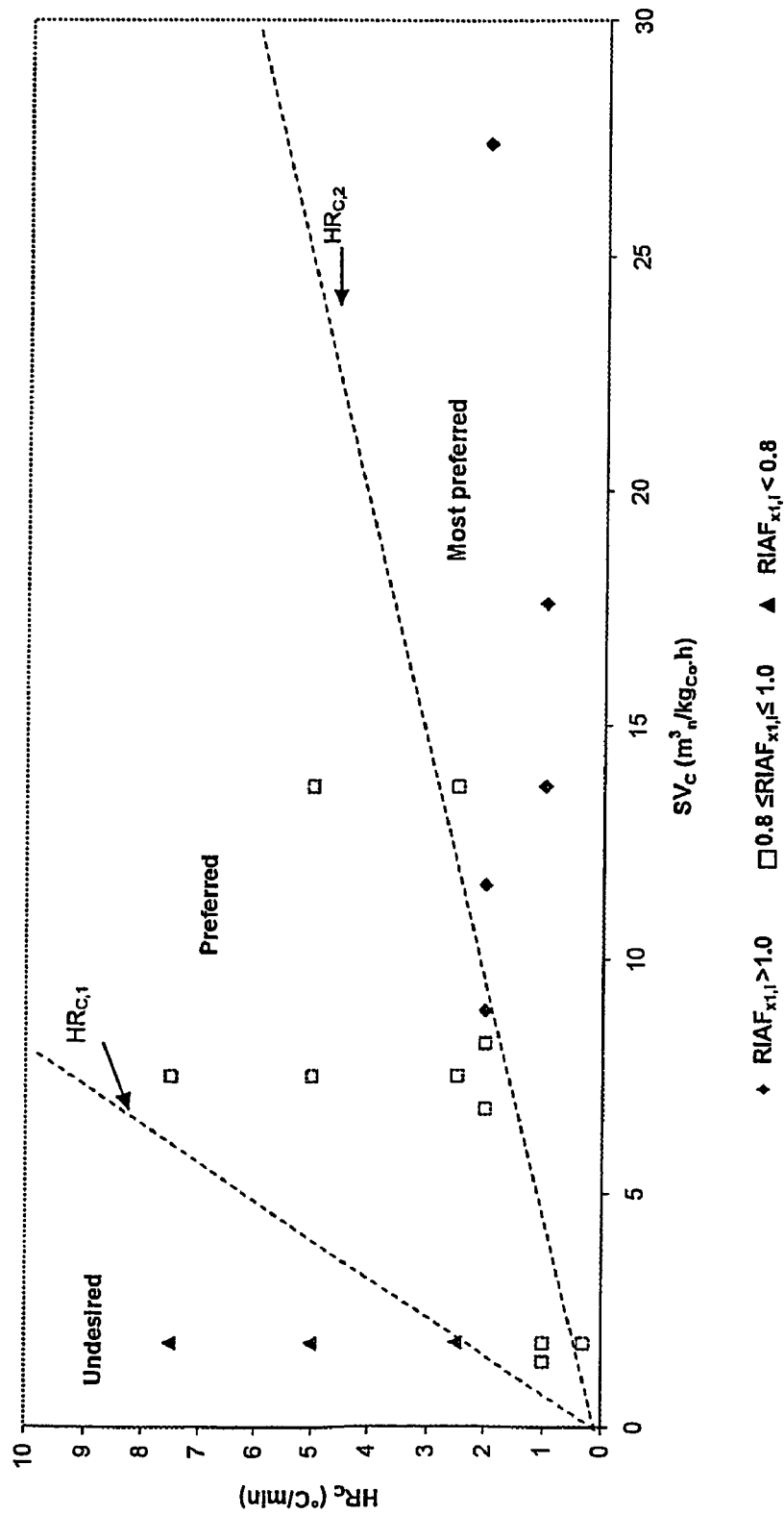
Figure 2: Correlation between $RIAF_{x1,i}$ and the applied activation procedure, where:
i) Reduction was achieved with $H_2$ of the more preferred purity
ii) The final reduction temperature was 425°C
iii) $SV2 = SV1$ and $HR2 = HR1$

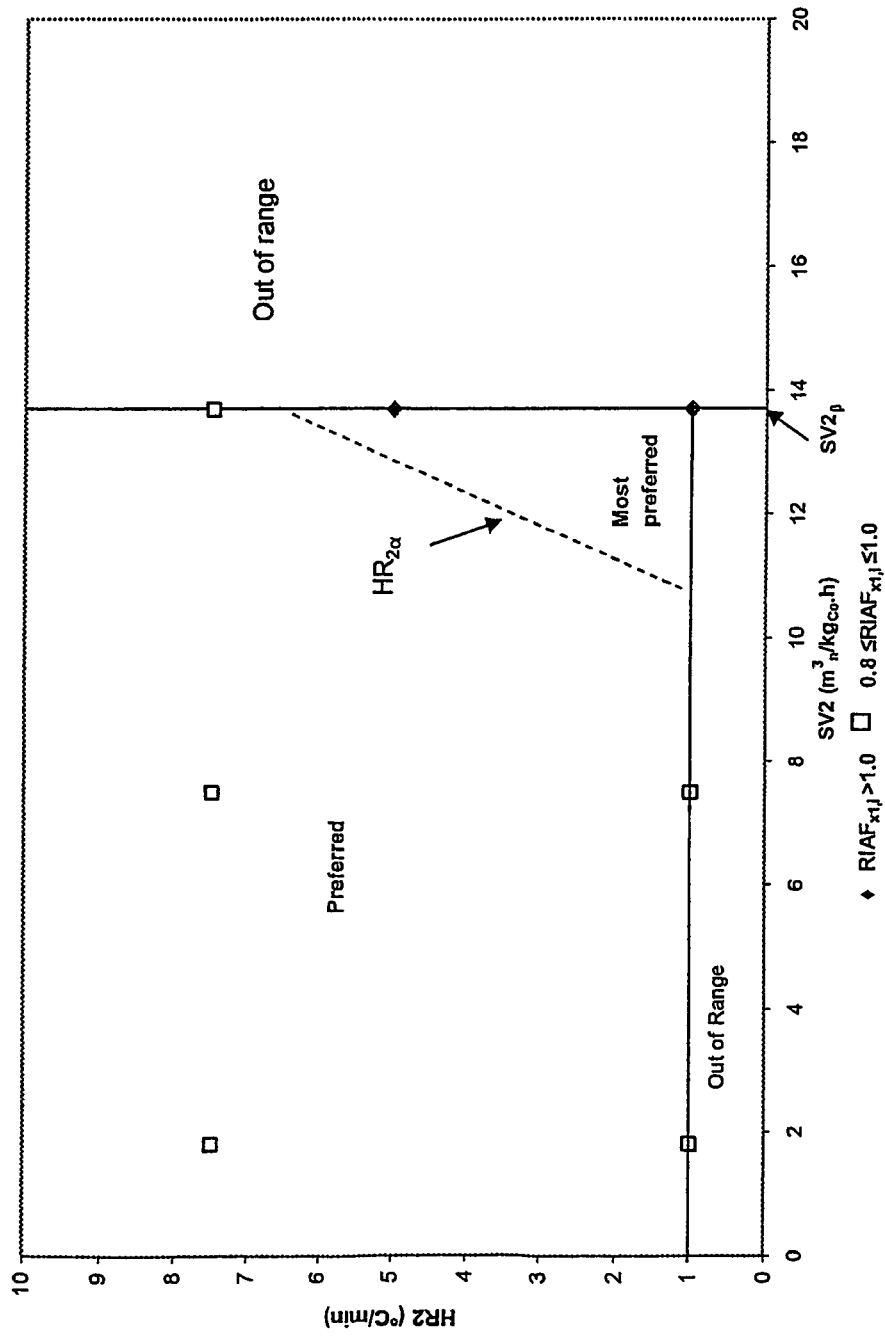
Figure 3: Correlation between RIAF$_{xt,j}$ and the applied activation procedure, where:
i) Reduction was achieved with H$_2$ of the more preferred purity
ii) The final reduction temperature was 425°C
iii) SV1 = 13.7 m$_n^3$/kg$_{Co}$·h and HR1 = 1.0 °C/min

PROCESS FOR ACTIVATING COBALT CATALYSTS

THIS INVENTION relates to catalysts. In particular, the invention relates to a process for producing a supported Fischer-Tropsch catalyst and to a catalyst obtained from the process.

As regards supported Fischer-Tropsch catalysts, it is well-known that precursors of such catalysts are prepared using a metal precursor and a particulate support. The catalyst precursor preparation involves a number of different catalyst preparation steps. The catalyst precursor is then, in an activation process or step, reduced, by using hydrogen, to obtain an active Fischer-Tropsch catalyst, which contains metal crystallites as the active component of the catalyst. Typically, the metal can be cobalt.

In known activation processes, ie reduction in a flowing hydrogen or hydrogen containing gas stream at elevated temperatures, for supported Fischer-Tropsch cobalt catalyst precursors that the Applicant is aware of, a preferred catalyst precursor is one in which $Co_3O_4$ is predominantly present. Furthermore, hydrocarbon synthesis catalyst activity is maximized by controlling the maximum water partial pressure (affected by factors such as temperature ramp schedule and gas space velocity) during the activation step; the activation step can take up to 24 hours. Activation periods (and thus cycle times in batch-continuous commercial scale activation of cobalt supported catalyst precursors) cannot readily be shortened without risking loss of control over the maximum water partial pressure, and consequently obtaining a hydrocarbon synthesis catalyst for which activity is not maximized. This risk is even greater when the catalyst precursor is a species that will challenge the control of maximum water partial pressure (under comparable conditions of e.g. temperature ramp schedule and gas space velocity) to a greater degree than is the case for a predominantly $Co_3O_4$ catalyst precursor species. It is thus an object of the present invention to provide a process for producing Fischer-Tropsch supported catalysts whereby these risks are overcome or at least reduced.

According to the invention, there is provided a process for producing a supported Fischer-Tropsch catalyst, which process includes treating, in a first activation stage, a particulate pre-reduction cobalt supported Fischer-Tropsch synthesis catalyst precursor which comprises a catalyst support impregnated with cobalt and containing reducible cobalt oxide in a calcined state and having a formula-unit in which each mole of cobalt atoms is associated with more than 4/3 moles of oxygen atoms and displaying a reducible cobalt oxide specific surface area at least equal to that of $Co_3O_4$ spinel, with a pure hydrogen reducing gas, at a first specific feed gas space velocity, SV1, and at a first heating rate, HR1, to obtain a partially reduced catalyst precursor; and thereafter treating the partially reduced catalyst precursor, in a second activation stage, with a pure hydrogen reducing gas, at a second specific feed gas space velocity, SV2, and at a second heating rate, HR2, to obtain an activated supported Fischer-Tropsch catalyst, where $SV2 \leq SV1$ and/or $HR2 \geq HR1$, provided that when $SV2=SV1$, $HR2 \neq HR1$ and when $HR2=HR1$, $SV2 \neq SV1$.

Thus, when SV2 is equal to SV1, HR2 is not equal to HR1, and when HR2 is equal to HR1, SV2 is not equal to SV1.

Examples of typical formula-units of the supported cobalt oxide, ie applicable formula units, are $CoO_aH_b$, where $a \geq 1.7$ and $b>0$ as disclosed in WO 01/39882A1, or monometal hydrotalcite-like compounds of $Co^{ii}_{0.74} Co^{iii}_{0.26} (OH)_{2.01} (NO_3)_{0.21} (CO_3)_{0.02}$ 0.6 $H_2O$ and $Co^{ii}_{0.74} Co^{iii}_{0.26} (OH)_{1.99} (CO_3)_{0.13} (NO_3)_{0.01}$ 0.7 $H_2O$ as described in: Chem. Matter.; 2000; 12; 3459-3465.

This defined pre-reduction reducible cobalt oxide phase, that distinguishes itself from $CO_3O_4$, is hereinafter referred to as 'labilized cobalt oxide'.

It was surprisingly found that a Fischer-Tropsch cobalt supported catalyst having high intrinsic activity is obtained from a precursor in which all the reducible cobalt is present as labilized cobalt oxide provided that the reduction or activation procedure according to the invention is used to activate the precursor.

Thus, in the pre-reduction catalyst precursor, all of the reducible cobalt of oxidation state >0 that is present in the catalyst precursor, is contained in labilized cobalt oxide. The catalyst precursor thus includes the catalyst support that has been impregnated with cobalt and calcined in such a controlled manner that all reducible cobalt present therein, ie cobalt that is associated with oxygen and elements such as hydrogen, nitrogen and/or carbon, in the absence of cobalt-support interaction, such as the formation of cobalt aluminates or cobalt silicates, that would decrease its reducibility, is present as labilized cobalt oxide. The term 'formula-unit' in respect of the cobalt oxide reflects the normalized atomic ratio between the elements Co and O, also including one or more of the elements H, N and/or C, of all the reducible cobalt oxide species present in the pre reduction catalyst precursor (ie calcined intermediate) ie cobalt oxide species that do not show observable interaction with the selected support material, eg $Al_2O_3$, $SiO_2$, $Al_2O_3$—$SiO_2$, $ZnO$ or $TiO_2$, such as the formation of cobalt aluminates or cobalt silicates, that would decrease its reducibility. The formula unit of all of these reducible cobalt oxide species lumped together, would not contain typical support elements, eg Al, Si, Zn or Ti, and are thus expressed in terms of $CoO_aH_bN_cC_d$ where $a>4/3$, $b>0$ and each one of c and $d \geq 0$, ie the earlier defined cobalt oxide.

Metal precursors of said labilized cobalt oxide will produce more water at a rate at least as fast, per unit amount of reducible cobalt, during its conversion to CoO as part of its activation (reduction by $H_2$) to the metal state, compared to $Co_3O_4$ spinel. Activation conditions that would produce, when the metal precursor is $Co_3O_4$ spinel, a supported cobalt based Fischer-Tropsch synthesis catalyst having a high initial Relative Intrinsic Fischer-Tropsch synthesis Activity Factor ('$RIAF_{x,i}$'), would thus not necessarily apply when labilized cobalt oxide is the metal precursor.

The Relative Intrinsic Fischer-Tropsch synthesis Activity Factor ('$RIAF_x$') of a supported cobalt slurry phase catalyst, of which the pre-reduction catalyst precursor has been prepared in strict accordance with a prescribed catalyst preparation procedure X, ie catalyst precursor X, is defined as:

$$RIAF_x = [A_x/A_{x,b}] \quad (1)$$

where:

a) $A_x$ is the Arrhenius pre-exponential factor of catalyst precursor X, activated according to an arbitrary reduction procedure b) $A_{x,b}$ is the Arrhenius pre-exponential factor of catalyst precursor X, estimated from the 15 hours on stream slurry-phase Continuous Stirred Tank Reactor (CSTR) Fischer-Tropsch synthesis performance under realistic conditions, and having utilized the following benchmark reduction procedure:

Fixed bed (20 mm internal diameter) reduction of 15±5 g catalyst precursor X (ie pre-reduction catalyst mass), at atmospheric pressure utilizing an undiluted H$_2$ reducing gas (purity of 5.0) as total feed at a space velocity of 1300 ml$_n$ per gram reducible cobalt per hour, whilst applying the following temperature program: heat from 25° C. to 425° C. at 1° C./min, and hold isothermally at 425° C. for 16 hours.

c) The pre-exponential factor A, ie applicable to both A$_x$ and A$_{x,b}$, is defined from the generally accepted cobalt-based Fischer-Tropsch empirical kinetic expression:

$$r_{FT} = [Ae^{(-Ea/RT)}P_{H2}P_{CO}]/[1+KP_{CO}]^2 \quad (2)$$

Thus:

$$A = [r_{FT}(1+KP_{CO})^2]/[e^{(-Ea/RT)}P_{H2}P_{CO}] \quad (3)$$

where:
$r_{FT}$ is expressed in terms of the number of moles of CO converted into Fischer-Tropsch synthesis products per unit time per unit mass is of the catalyst precursor in its pre-reduction state.

Furthermore, an initial RIAF$_x$, ie RIAF$_{x,i}$, is defined as:

RIAF$_{x,i}$=RIAF$_x$ at 16.5±1.5 hours on stream slurry phase CSTR Fischer-Tropsch synthesis performance under realistic conditions, where realistic slurry phase CSTR Fischer-Tropsch synthesis conditions are:

| | |
|---|---|
| Reactor temperature | 220.0 ± 0.5° C. |
| Reactor pressure | 20.5 ± 0.7 bar |
| % (H$_2$ + CO) conversion | 60 ± 13 |

Feed gas composition:

| | |
|---|---|
| H$_2$ | about (ca.) 50 vol % |
| CO | ca. 25 vol % |
| Balance | Ar, N$_2$, CH$_4$, and/or CO$_2$ |

The treatments in the first and second activation stages may, at least in principle, be effected by using any suitable contacting configuration of the catalyst precursor with the reducing gas, such as a fluidized bed of the catalyst precursor particles, with the reducing gas acting as the fluidizing medium; a fixed bed of the catalyst precursor particles through which the reducing gas passes; or the like. However, a fluidized bed configuration is preferred.

As regards the catalyst activation procedure, the following standard approach may be considered: SV2=SV1=SV$_c$ and HR2=HR1=HR$_c$. In other words, the feed gas space velocity and the heating rate are kept constant over the entire activation procedure, ie over both the first and second activation stages, with the subscript 'c'. denoting that the space velocity and the heating rate are kept constant over the entire activation procedure.

Different combinations of SV$_c$ and HR$_c$ can be considered and evaluated with respect to their impact on RIAF$_{x,i}$. On the basis of the supposition that:
RIAF$_{x,i}$<0.8 is undesired
0.8≦RIAF$_{x,i}$≦1.0 is preferred
RIAF$_{x,i}$>1.0 is most preferred, 'undesired', 'preferred' and 'most preferred' ranges for combinations of HR1 and SV1 can be derived as follows (as also dealt with in more detail hereinafter with reference to FIG. 2):

HR$_{c,1}$ is defined as the maximum value of HR$_c$ that will result in a RIAF$_{x,i}$≧0.8 at selected values of SV$_c$, thus implying that HR$_{c,1}$=f(SV$_c$).

HR$_{c,2}$ is defined as the maximum value of HR$_c$ that will result in a RIAF$_{x,i}$≧1.0 at selected values of SV$_c$, thus implying that HR$_{c,2}$=f(SV$_c$).

Undesired, preferred and most preferred ranges for HR1 are defined as:
0<HR1<HR$_{c,2}$ is most preferred,
HR$_{c,2}$≦HR1≦HR$_{c,1}$ is preferred,
and HR1>HR$_{c,1}$ is undesired.

If reduction is performed in a fluidized bed then the quantification of a minimum allowable SV1 (ie SV1$_{min}$) and a maximum allowable SV1 (ie SV1$_{max}$) is dictated by the condition of proper fluidization during the whole of the first catalyst activation stage. Thus: SV1<SV1$_{min}$ as well as SV1>SV1$_{max}$ are out of range, i.e. are not applicable. The same condition of proper fluidization also applies to the whole of the second activation stage, thus also implying the existence of a minimum allowable SV2 (ie SV2$_{min}$) and a maximum allowable SV2 (ie SV2$_{max}$). Proper fluidization depends on the reactor configuration and the catalyst properties. Preferred regimes of fluidization are the turbulent, churning and bubbling/slugging regimes, with the turbulent and churning regimes being the more preferred, and the churning regime the most preferred (refer: Design Manual of the Particulate Solid Research Institute (PRSI), USA, September 1993). A person skilled in the art, using the PRSI Design Manual, and applying the selected reactor configuration and catalyst properties can thus determine the appropriate values for SV1$_{min}$, SV1$_{max}$, SV2$_{min}$, and SV2$_{max}$ that would provide for the targeted fluidization regime. In addition, SV2≦SV2$_\beta$ (where SV2$_\beta$ is the minimum of SV1 and SV2$_{max}$) and HR2≧HR1. Within these constraints, different combinations of SV2 and HR2 can be considered and evaluated with respect to their impact on the RIAF$_{x,i}$. On the basis of the supposition, as hereinbefore given, that:
RIAF$_{x,i}$<0.8 is undesired
0.8≦RIAF$_{x,i}$≦1.0 is preferred
RIAF$_{x,i}$>1.0 is most preferred 'undesired', 'preferred' and 'most preferred' ranges for allowable combinations of HR2 and SV2, for a particular set of HR1 and SV1, have been derived as follows (as also dealt with in more detail hereinafter with reference to FIG. 3):

HR2$_\beta$ is defined as the maximum value of HR2 that will result in a RIAF$_{x,i}$≧0.8 at selected values of SV2, ie SV2$_{min}$≦SV2≦SV2$_\beta$, where SV2$_\beta$ is the minimum of SV1 and SV2$_{max}$; and HR2$_\alpha$ is defined as the maximum value of HR2 that will result in a RIAF$_{x,i}$≧1.0 at selected values of SV2, ie SV2$_{min}$≦SV2≦SV2$_\beta$, where SV2$_\beta$ is the minimum of SV1 and SV2$_{max}$.

A basic premise of what is set out hereinbefore is that constant space velocities are maintained during the treatment in the first activation stage, ie SV1 is constant, as well as during the treatment in the second activation stage, ie SV2 is constant, with SV2≦SV1. This is thus in accordance with a first embodiment of this aspect of the invention.

The first activation stage commences at the subjection of the pure pre-reduction catalyst precursor (i.e. the intermediate product containing all the reducible cobalt as labilized cobalt oxide in the absence of any matter that was accumulated during storage and/or handling, such as physically adsorbed moisture) to a pure hydrogen environment at SV1 with the immediate application of HR1. In cases where the pre-reduction catalyst precursor has adsorbed moisture, a predrying phase may be applied in order to reestablish the labilized cobalt oxide purity. The first activation stage treatment may then be continued until all of the reducible cobalt has been converted quantitatively to CoO at which stage the partially reduced catalyst precursor has been obtained; this is expected at a bed temperature from 150° C. to 280° C., ie at T* in FIG. 1 discussed hereinafter. Thus, at the commencement of the second activation stage treatment, the temperature in the second activation stage, ie the temperature of the partially reduced catalyst precursor, will have a value in the range of 150° C. to 280° C. The second activation stage treatment may then be continued until the temperature in the second treatment stage, ie the temperature of the activated Fischer-Tropsch catalyst, has a value in the range of about 300° C. to about 600° C., with a preferred value being in the range of 300° C. to 500° C., and a most preferred value being in the range of 300° C. to 450° C.

In a second embodiment of the invention, the space velocities during the first and/or the second activation stages may be varied, provided that the following conditions are met:

First activation stage ('stage 1'): $SV1_t$ is defined as the prevailing pure hydrogen space velocity at time t during stage 1 and $SV1_f$ is defined as the pure hydrogen space velocity at the end of stage 1. The restrictions on $SV1_t$ and $SV1_f$ are: $SV1_t \geq SV1_f$, $SV1_t \leq SV1_{max}$, and the combination of (HR1, $SV1_f$) is within the preferred, or, more preferably, the most preferred, ranges applicable to combinations of HR1 and SV1, as hereinbefore described.

Second activation stage ('stage 2'): $SV2_t$ is defined as the prevailing pure hydrogen space velocity at time t during stage 2 and $SV2_f$ is defined as the pure hydrogen space velocity at the end of stage 2. The restrictions on $SV2_t$ and $SV2_f$ are: $SV2_t \geq SV2_f$, $SV2_t \leq SV2_\beta$ (where $SV2_\beta$ in the case of varied space velocities is the minimum of $SV1_f$ and $SV2_{max}$), and the combination of (HR2, $SV2_f$) is within the preferred, or, more preferably, the most preferred, ranges applicable to combinations of HR2 and SV2.

This embodiment of the first aspect of the invention caters for the situation where it is desired to fix the superficial gas velocity during activation stage 1 and/or activation stage 2, while still producing a final catalyst with an $RIAF_{x,i} \geq 0.8$. Superficial or linear velocity is the volumetric flow rate (at vessel temperature and pressure) of gas per unit cross-sectional area of the reducing reactor. Corrections for temperature, pressure, cross-sectional area and mass of reducible cobalt loaded into the reactor are needed to convert linear (superficial) velocity to SV ($SV1_t$; $SV2_t$) values.

By 'pure hydrogen reducing gas' which is used in the two activation stages, is meant a hydrogen containing gas mixture comprising $\geq 90$ vol % $H_2$ and $\leq 10$ vol % inerts, preferably $\geq 97$ vol % $H_2$ and $\leq 3$ vol % inerts. The inerts could be any combination of Ar, He, $N_2$ and $H_2O$, with the preferred dewpoint of the pure hydrogen reducing gas being $\leq 4°$ C., more preferred $\leq -30°$ C.

The treatment in both the first and second activation stages may be effected at about atmospheric pressure, preferably at between 0.6 and 1.5 bar(a), and most preferred at between 0.8 and 1.3 bar(a).

The freshly activated Fischer-Tropsch catalyst, ie the catalyst at the end of the second activation stage and which is thus still at elevated temperature, may be cooled down in pure hydrogen to a temperature $T_c$, and thereafter cooled further to room temperature in substantially pure nitrogen. The temperature $T_c$ must be low enough to ensure that nitrogen behaves as an inert during the last leg of this cooling phase. The switch temperature $T_c$ is easily established by plotting RIAF as a function of $T_c$. A preferred value for $T_c$ is one that will ensure a $RIAF_{x,i}$ between 0.8 and 1.0, and a most preferred value for $T_c$ is one that will ensure a $RIAF_{x,i} \geq 1.0$.

The particulate pre-reduction cobalt supported Fischer-Tropsch synthesis catalyst precursor may be any suitable catalyst precursor requiring activation or reduction to obtain an active Fischer-Tropsch catalyst. However, it is preferably that obtained by forming a slurry of a particulate catalyst support, a cobalt compound as an active component precursor, and water; subjecting the catalyst support to impregnation with the cobalt compound; drying the impregnated catalyst support; and calcining the impregnated support, to obtain the catalyst precursor. The catalyst precursor thus obtained must however, then still be activated or reduced prior to using it for catalyzing a Fischer-Tropsch reaction, and this reduction or activation is effected in accordance with the method of the present invention. The resultant catalyst is thus an activated Fischer-Tropsch catalyst.

Any commercially available preshaped porous oxide catalyst support, such as $Al_2O_3$, silica ($SiO_2$), titania ($TiO_2$), magnesia (MgO), $SiO_2$—$Al_2O_3$ and zinc oxide (ZnO), may be used. The support preferably has an average pore diameter between 8 and 50 nanometers, more preferably between 10 and 15 nanometers. The support pore volume may be between 0.1 and 1.0 ml/g, preferably between 0.3 and 0.9 ml/g. The average particle size is preferably between 1 and 500 micrometers, more preferably between 10 and 250 micrometers, still more preferably between 45 and 200 micrometers.

The support may be a protected modified catalyst support, containing, for example, silicon as modifying component, as described in EP Application No. 99906328.2 (European Publication No. 1058580), which is hence incorporated herein by reference.

The cobalt loading can be between 5 gCo/100 g support and 70 gCo/100 g support, preferably between 20 gCo/100 g support and 40 gCo/100 g support.

The cobalt salt may, in particular, be cobalt nitrate, $Co(NO_3)_2 \cdot 6H_2O$.

The impregnation of the catalyst support may, in principle, be effected by any known method or procedure such as incipient wetness impregnation or slurry impregnation. However, the impregnation may, in particular, be effected in the manner described in U.S. Pat. No. 6,455,462 or in U.S. Pat. No. 5,733,839, and which are thus incorporated herein by reference. The support impregnation may thus involve a 2-step slurry phase impregnation process, which is dependent on a desired cobalt loading requirement and the pore volume of the catalyst support.

The support impregnation and drying may typically be effected in a conical vacuum drier with a rotating screw or in a tumbling vacuum drier.

During the cobalt impregnation steps, a water soluble precursor salt of platinum (Pt), palladium (Pd), ruthenium (Ru) or mixtures thereof, may be added, as a dopant capable of enhancing the reducibility of the active component. The mass proportion of this dopant, when used, to cobalt may be between 0.01:100 and 0.3:100.

Calcination of the impregnated and dried material may be done using any method, known to those skilled in the art, for example in a fluidized bed, or a rotary kiln, calciner at 200-350° C. It may, in particular, be effected as described in PCT Patent Application WO 01/39882, which is thus also incorporated herein by reference.

The impregnation procedure and/or the drying procedure and/or the calcination procedure will thus be selected such that, in the catalyst precursor, all reducible cobalt present in the support is in the form of labilized cobalt oxide. This can, for example, be achieved by adopting the calcination procedure described in WO 01/39882.

The invention extends also to an activated Fischer-Tropsch catalyst, when obtained by the process of the first aspect of the invention.

The activated Fischer-Tropsch catalyst can be used in a process for producing hydrocarbons, which includes contacting a synthesis gas comprising hydrogen ($H_2$) and carbon monoxide (CO) at an elevated temperature between 180° C. and 250° C. and an elevated pressure between 10 and 40 bar with an activated Fischer-Tropsch catalyst as hereinbefore described, using a slurry phase Fischer-Tropsch reaction of the hydrogen with the carbon monoxide.

The invention will now be described in more detail with reference to the following drawings and to the accompanying nonlimiting examples:

FIG. 1 shows a temperature programmed reduction ('TPR') profile of the cobalt catalyst precursor X1 of Example 1 (reduction at atmospheric pressure; reducing gas=pure hydrogen; linear heating rate of 2° C./min; total feed gas rate of 10.7 $m^3_n/kg_{Co}hr$; fixed bed operated under differential conditions that approach the near-gradientless conditions of fluidised beds);

FIG. 2 is a schematic graphical drawing, on which data applicable to the cobalt catalyst precursor X1 are superimposed, to illustrate the definitions of 'undesired', 'preferred', and 'most preferred' ranges for allowable combinations of HR1 and SV1;

FIG. 3 is a schematic graphical drawing, on which data applicable to the cobalt catalyst precursor X1 are superimposed, to illustrate the definitions of 'preferred', and 'most preferred' ranges for allowable combinations of HR2 and SV2 at a specific set of (HR1,SV1) values, viz HR1=1.0° C./min and SV1=13.7 $m^3_n/(kg_{Co}h)$.

EXAMPLE 1

As a specific example of a catalyst precursor X, a 30 gCo/100 g $Al_2O_3$ proprietary slurry phase Fischer-Tropsch synthesis catalyst of the Applicant, as fully described in WO 01/39882, is considered. If the pre-reduced catalyst precursor or intermediate (labelled as X1), having been prepared according to this strict procedure, is furthermore subjected to the following benchmark reduction procedure:

Fixed bed (20 mm internal diameter) reduction of 15±5 g of the catalyst precursor X1 (ie pre-reduction catalyst mass), at atmospheric pressure, utilizing an undiluted $H_2$ reducing gas (purity of 5.0) as total feed at a space velocity of 1300 $ml_n$ per gram reducible cobalt per hour, whilst applying the following temperature program: heat from 25° C. to 425° C. at 1° C./min, and hold isothermally at 425° C. for 16 hours, the following Arrhenius pre-exponential factor is established:
$A_{X1,b}$=138546 [mol CO/(g calcined catalyst.s.$bar^2$)].

A representative batch of this pre-reduced catalyst precursor (ie precursor X1) was specifically prepared as follows: A solution of 17.4 kg of $Co(NO_3)_2.6H_2O$, 9.6 g of $(NH_3)_4Pt(NO_3)_2$, and 11 kg of distilled water was mixed with 20.0 kg of a gamma alumina support (Puralox SCCa 5/150, pore volume of 0.48 ml/g, from SASOL Germany GmbH of Uberseering 40, 22297 Hamburg, Germany) by adding the support to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the impregnated and dried catalyst support was immediately and directly loaded into a fluidised bed calciner. The temperature of the dried impregnated catalyst support was about 75° C. at the time of loading, into the calciner. The loading took about 1 to 2 minutes, and the temperature inside the calciner remained at its set point of about 75° C. The dried impregnated catalyst support was heated from 75° C. to 250° C., using a heating rate of 0.5° C./min and an air space velocity of 1.0 $m^3_n$/kg $Co(NO_3)_2.6H_2O$/h, and kept at 250° C. for 6 hours. To obtain a catalyst with a cobalt loading of 30 gCo/100 g$Al_2O_3$, a second impregnation/drying/calcination step was performed. A solution of 9.4 kg of $CO(NO_3)_2.6H_2O$, 15.7 g of $(NH_3)_4Pt(NO_3)_2$, and 15.1 kg of distilled water was mixed with 20.0 kg of the catalyst precursor from the first impregnation and calcination, by adding the catalyst precursor to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the treated catalyst support was immediately and directly loaded into the fluidised bed calciner. The temperature of the dried impregnated catalyst support was about 75° C. at the time of loading into the calciner. The loading took about 1 to 2 minutes, and the temperature inside the calciner remained at its set point of about 75° C. The dried impregnated catalyst was heated from 75° C. to 250° C., using a heating rate of 0.5° C./min and an air space velocity pf 1.0 $m^3_n$/kg $Co(NO_3)_2.6H_2O$/h, and kept at 250° C. for 6 hours. A supported cobalt catalyst precursor on an alumina support was thus obtained.

EXAMPLE 2

A temperature programmed reduction ('TPR') experiment was performed with the cobalt catalyst precursor of Example 1, ie with catalyst precursor X1. The TPR experiment was performed at atmospheric pressure, using a heating rate ('HR') of 2° C./min, and a pure hydrogen feed rate of approximately 10.7 $m^3_n/kg_{Co}hr$, in a fixed bed reactor. The results are presented in FIG. 1. It can be seen from FIG. 1 that the activation takes place in two activation stages with the end of activation stage 1 defined by T*=250° C.

EXAMPLE 3

Cobalt catalyst precursors, as prepared in Example 1, were reduced according to different activation procedures, as given in Table 1 and Table 2, and subjected to the following Fischer-Tropsch synthesis test:

Between 10 g and 30 g of the resultant reduced catalyst, ranging between 38 micron to 150 micron, was suspended in 300 ml molten wax and loaded in a CSTR with an internal volume of 500 ml. The feed gas consisted of hydrogen and carbon monoxide in a $H_2$/CO molar ratio from 1.5/1 to 2.3/1. This reactor was electrically heated and sufficiently high stirrer speeds were employed so as to eliminate any gas-liquid mass transfer limitations. The feed flow was controlled by means of Brooks mass flow controllers, and space velocities ranging from 2 to 4 $m^3{}_n/kg_{cat}hr$ were used. GC analyses of the permanent gases as well as the volatile overhead hydrocarbons were used in order to characterize the product spectra.

The respective $RIAF_{X1,i}$ were estimated from these slurry phase CSTR Fischer-Tropsch synthesis runs, as given in Table 5, and correlated with the selected activation procedures of Table 1 and Table 2, as portrayed in FIG. 2 and FIG. 3.

EXAMPLE 4

Cobalt catalyst precursors, as prepared in Example 1, were reduced in hydrogen feedgas of distinct dewpoint, as given in Table 3, and subjected to the Fischer-Tropsch synthesis test described in Example 3. The respective $RIAF_{X1,i}$ were estimated from these slurry phase CSTR Fischer-Tropsch synthesis runs, as given in Table 5.

EXAMPLE 5

Cobalt catalyst precursors, as prepared in Example 1, were reduced in feed gas of distinct hydrogen content, as given in Table 4, and subjected to the Fischer-Tropsch synthesis test described in Example 3. The respective $RIAF_{X1,i}$ were estimated from these slurry phase CSTR Fischer-Tropsch synthesis runs, as given in Table 5.

TABLE 1

Correlation between $RIAF_{x1,i}$ and the applied activation procedure, where:
i) Reduction was achieved with $H_2$ of the more preferred purity
ii) The final reduction temperature was 425° C.

| | | Fischer-Tropsch synthesis data | | |
|---|---|---|---|---|
| $SV_c$ ($m^3{}_n/kg_{Co} \cdot h$) | $HR_c$ (° C./min) | Synthesis run number | $RIAF_{x1,i}$ | Performance indicator |
| 1.4 | 1.0 | 125£ | 1.0 | Preferred |
| 1.8 | 0.3 | 529F | 1.0 | Preferred |
| 1.8 | 1.0 | 332F | 1.0 | Preferred |
| | | 239(SR3) | 0.8 | |
| 1.8 | 2.5 | 250(SR3) | 0.7 | Undesired |
| 1.8 | 5.0 | 240(SR3) | 0.7 | Undesired |
| 1.8 | 7.5 | 248(SR3) | 0.7 | Undesired |
| 6.8 | 2.0 | 393F | 1.0 | Preferred |
| 7.5 | 2.5 | 253(SR3) | 1.0 | Preferred |
| 7.5 | 5.0 | 254(SR3) | 1.0 | Preferred |
| 7.5 | 7.5 | 255(SR3) | 0.9 | Preferred |
| 8.2 | 2.0 | 394F | 0.9 | Preferred |
| 8.9 | 2.0 | 352F | 1.0 | Most preferred |
| | | 387F | 1.1 | |
| 11.6 | 2.0 | 351F | 1.0 | Most Preferred |
| | | 385F | 1.1 | |
| 13.7 | 1.0 | 15£ | 1.1 | Most Preferred |
| | | 126£ | 1.1 | |
| | | 242(SR3) | 1.0 | |
| | | 241(SR3) | 1.1 | |
| | | 37# | 1.1 | |
| | | 38# | 1.1 | |
| 13.7 | 2.5 | 238(SR3) | 1.0 | Preferred |
| 13.7 | 5.0 | 20£ | 1.0 | Preferred |
| | | 236(SR3) | 1.0 | |
| 17.6 | 1.0 | 129£ | 1.0 | Most Preferred |
| | | 234(SR3) | 1.1 | |
| | | 235(SR3) | 1.1 | |
| 27.4 | 2.0 | 381F | 1.2 | Most Preferred |
| | | 379F | 1.0 | |

TABLE 2

Correlation between $RIAF_{x1,i}$ and the applied activation procedure, where:
i) Reduction was achieved with $H_2$ of the more preferred purity
ii) The final reduction temperature was 425° C.
iii) SV1 = 13.7 $m^3{}_n/kg_{co} \cdot h$.
HR1 = 1.0° C./min

| | | Fischer-Tropsch synthesis data | | |
|---|---|---|---|---|
| SV2 ($m^3{}_n/kg_{Co} \cdot h$) | HR2 (° C./min) | Synthesis run number | $RIAF_{x1,i}$ | Performance indicator |
| 13.7 | 1.0 | 15£ | 1.1 | Most Preferred |
| | | 126£ | 1.1 | |
| | | 242(SR3) | 1.0 | |
| | | 241(SR3) | 1.1 | |
| | | 37# | 1.1 | |
| | | 38# | 1.1 | |
| 13.7 | 5.0 | 61£ | 1.2 | Most Preferred |
| | | 33# | 1.2 | |
| 13.7 | 7.5 | 257(SR3) | 1.0 | Preferred |
| 7.5 | 1.0 | 251(SR3) | 0.9 | Preferred |
| 7.5 | 7.5 | 31# | 1.0 | Preferred |
| 1.8 | 1.0 | 252(SR3) | 1.0 | Preferred |
| 1.8 | 7.5 | 30# | 0.9 | Preferred |

TABLE 3

Correlation between $RIAF_{x1,i}$ and the hydrogen feedgas dewpoint during catalyst activation, where:
i) Reduction was achieved with a total feedgas containing ≧ 97 vol % hydrogen
ii) The final reduction temperature was 425° C.
ii) SV2 = SV1 and HR2 = HR1

| Dewpoint of total feed (° C.) | $SV_c$ ($m^3{}_n/kg_{Co} \cdot h$) | $HR_c$ (° C./min) | Synthesis run number | $RIAF_{x1,i}$ | Performance indicator |
|---|---|---|---|---|---|
| ≦−30 | 1.8 | 1.0 | 332F | 1.0 | Preferred |
| | | | 239(SR3) | 0.8 | |
| 15 | 1.8 | 1.0 | 532F | 0.7 | Undesired |
| 24 | 1.8 | 1.0 | 533F | 0.7 | Undesired |

TABLE 4

Correlation between $RIAF_{x1,i}$ and the hydrogen content of the total feed during catalyst activation, where:
i) Reduction was achieved with a total feedgas of which the dewpoint was ≦ −30° C.
ii) The final reduction temperature was 425° C.
iii) SV2 = SV1 and HR2 = HR1

| Hydrogen Content of total feed (vol %) | $SV_c$ ($m^3{}_n/kg_{Co} \cdot h$) | $HR_c$ (° C./min) | Synthesis run number | $RIAF_{x1,i}$ | Performance Indicator |
|---|---|---|---|---|---|
| ≧97 | 13.7 | 1.0 | 15£ | 1.1 | Most preferred |
| | | | 126£ | 1.1 | |
| | | | 242(SR3) | 1.0 | |
| | | | 241(SR3) | 1.1 | |
| | | | 37# | 1.1 | |
| | | | 38# | 1.1 | |
| 90 | 13.7 | 1.0 | 530F | 1.1 | Most preferred |

TABLE 5

Laboratory CSTR Fischer-Tropsch synthesis performance comparison between catalysts X1 prepared using different activation procedures, as given in Table 1 through Table 4.

| | Run Number | | | | | | | | | |
|---|---|---|---|---|---|---|---|---|---|---|
| | 234(SR3) | 235(SR3) | 236(SR3) | 238(SR3) | 239(SR3) | 240(SR3) | 241(SR3) | 242(SR3) | 248(SR3) | 250(SR3) |
| Synthesis conditions: | | | | | | | | | | |
| Calcined cat. mass (g) | 13.1 | 12.8 | 13.1 | 12.7 | 11.8 | 11.6 | 12.5 | 13.4 | 13.6 | 12.8 |
| Reactor temp (° C.) | 220 | 220 | 220 | 220 | 220 | 220 | 220 | 220 | 220 | 221 |
| Reactor pressure (bar) | 20.4 | 21.1 | 20.8 | 20.8 | 20.2 | 20.2 | 20.5 | 20.0 | 20.2 | 20.0 |
| Time on stream (h) | 15.0 | 15.0 | 15.0 | 15.0 | 15.0 | 16.0 | 15.0 | 15.0 | 15.0 | 15.0 |
| Feed gas composition: | | | | | | | | | | |
| $H_2$ (vol %) | 49.6 | 50.3 | 50.8 | 51.2 | 50.7 | 51.3 | 50.3 | 50.4 | 50.7 | 49.4 |
| CO (vol %) | 27.4 | 26.6 | 26.6 | 26.0 | 25.8 | 26.2 | 27.2 | 26.0 | 26.1 | 26.3 |
| $CO_2$ (vol %) | 0.7 | 0.7 | 0.8 | 0.7 | 0.8 | 0.5 | 0.4 | 0.8 | 0.6 | 0.7 |
| Syngas ($H_2$ + CO) space velocity ($m^3_n$/(kg cat.h) | 3.6 | 3.4 | 3.5 | 3.5 | 3.3 | 3.3 | 3.5 | 3.3 | 3.3 | 3.2 |
| Reactor partial pressures: | | | | | | | | | | |
| $H_2$ | 5.1 | 4.8 | 5.3 | 5.0 | 6.1 | 6.7 | 5.2 | 4.7 | 6.5 | 6.1 |
| CO | 3.3 | 2.9 | 3.1 | 2.9 | 3.2 | 3.5 | 3.3 | 2.6 | 3.5 | 3.3 |
| $H_2O$ | 4.1 | 4.7 | 4.3 | 4.4 | 3.5 | 3.1 | 4.2 | 4.4 | 3.1 | 3.2 |
| $CO_2$ | 0.3 | 0.3 | 0.3 | 0.3 | 0.2 | 0.1 | 0.2 | 0.3 | 0.2 | 0.2 |
| Synthesis performance | | | | | | | | | | |
| Conversion: (% syngas) | 60 | 66 | 61 | 64 | 53 | 48 | 61 | 65 | 49 | 51 |
| $RIAF_{x1,i}$ | 1.1 | 1.1 | 1.0 | 1.0 | 0.8 | 0.7 | 1.1 | 1.0 | 0.7 | 0.7 |
| % C-atom $CH_4$ selectivity | 7.4 | 6.0 | 7.0 | 10.3 | 4.8 | 6.7 | 5.8 | 8.5 | 6.8 | 6.8 |
| % CO of total amount of CO converted to $CO_2$ | 2.1 | 1.7 | 1.3 | 2.3 | 0.5 | 0.5 | 0.9 | 2.2 | 1.0 | 1.1 |

| | Run Number | | | | | |
|---|---|---|---|---|---|---|
| | 251(SR3) | 252(SR3) | 253(SR3) | 254(SR3) | 255(SR3) | 257(SR3) |
| Synthesis conditions: | | | | | | |
| Calcined cat. mass (g) | 12.9 | 12.1 | 13.6 | 12.1 | 13.1 | 13.4 |
| Reactor temp (° C.) | 220 | 220 | 220 | 220 | 220 | 220 |
| Reactor pressure (bar) | 20.6 | 20.2 | 21.0 | 21.0 | 20.4 | 20.6 |
| Time on stream (h) | 15.0 | 15.0 | 16.0 | 16.0 | 15.0 | 15.5 |
| Feed gas composition: | | | | | | |
| $H_2$ (vol %) | 49.0 | 49.5 | 50.7 | 49.5 | 50.1 | 49.6 |
| CO (vol %) | 26.7 | 26.5 | 25.9 | 26.7 | 26.0 | 26.5 |
| $CO_2$ (vol %) | 0.9 | 0.8 | 0.8 | 0.7 | 0.8 | 0.8 |
| Syngas ($H_2$ + CO) space velocity ($m^3_n$/(kg cat.h) | 3.2 | 3.3 | 3.4 | 3.2 | 3.3 | 3.2 |
| Reactor partial pressures: | | | | | | |
| $H_2$ | 5.2 | 5.1 | 5.0 | 5.0 | 5.4 | 4.8 |
| CO | 3.1 | 2.9 | 2.7 | 3.0 | 2.9 | 2.6 |
| $H_2O$ | 4.1 | 4.2 | 4.7 | 4.5 | 4.1 | 4.7 |
| $CO_2$ | 0.3 | 0.3 | 0.3 | 0.3 | 0.3 | 0.3 |
| Synthesis performance | | | | | | |
| Conversion: (% syngas) | 60 | 61 | 66 | 63 | 60 | 66 |
| $RIAF_{x1,i}$ | 0.9 | 1.0 | 1.0 | 1.0 | 0.9 | 1.0 |
| % C-atom $CH_4$ selectivity | 7.3 | 6.1 | 3.6 | 6.2 | 5.5 | 6.8 |
| % CO of total amount of CO converted to $CO_2$ | 0.9 | 1.2 | 1.8 | 1.7 | 1.3 | 1.3 |

TABLE 5-continued

Laboratory CSTR Fischer-Tropsch synthesis performance comparison between catalysts X1 prepared using different activation procedures, as given in Table 1 through Table 4.

| | Run number | | | | | | | | | | | | | | | |
|---|---|---|---|---|---|---|---|---|---|---|---|---|---|---|---|---|
| | 351F | 352F | 379F | 381F | 385F | 387F | 393F | 394F | 529F | 530F | 532F | 533F | 30# | 31# | 33# | 37# |
| Synthesis conditions: | | | | | | | | | | | | | | | | |
| Calcined catalyst mass (g) | 15.0 | 17.5 | 15.9 | 15.0 | 16.7 | 16.6 | 18.3 | 20.0 | 12.9 | 13.1 | 12.8 | 15.3 | 12.8 | 13.1 | 13.1 | 12.5 |
| Reactor temp (° C.) | 220 | 220 | 220 | 220 | 220 | 220 | 220 | 220 | 220 | 220 | 221 | 220 | 220 | 220 | 220 | 220 |
| Reactor pressure(bar) | 20.0 | 19.9 | 20.0 | 19.8 | 20.0 | 19.9 | 20.0 | 20.1 | 20.0 | 20.2 | 20.2 | 20.2 | 20.6 | 20.4 | 20.5 | 20.2 |
| Time on stream (h) | 15.5 | 15.5 | 15.8 | 15.3 | 15.8 | 15.5 | 15.0 | 15.0 | 15.0 | 15.0 | 15.0 | 15.0 | 15.0 | 15.2 | 15.1 | 15.2 |
| Feed gas composition: | | | | | | | | | | | | | | | | |
| $H_2$(vol %) | 50.1 | 52.1 | 50.2 | 50.6 | 51.7 | 50.7 | 51.7 | 52.2 | 43.6 | 42.6 | 42.7 | 44.5 | 50.7 | 49.2 | 50.0 | 49.9 |
| CO(vol %) | 27.3 | 26.9 | 27.5 | 26.7 | 26.9 | 27.4 | 27.2 | 27.1 | 24.0 | 24.5 | 24.3 | 25.3 | 26.7 | 27.2 | 26.5 | 27.3 |
| $CO_2$ (vol %) | 0.7 | 0.4 | 0.8 | 0.7 | 0.7 | 0.6 | 0.7 | 0.8 | 0.5 | 0.5 | 0.6 | 0.6 | 0.7 | 1.0 | 0.7 | 0.8 |
| Syngas ($H_2$ + CO) space velocity ($m^3_n$/(kg cat.h) | 3.5 | 3.7 | 3.6 | 3.6 | 3.7 | 3.5 | 3.6 | 3.6 | 3.0 | 2.9 | 3.0 | 3.0 | 3.4 | 3.2 | 3.0 | 3.5 |
| Reactor partial pressures: | | | | | | | | | | | | | | | | |
| $H_2$ (bar) | 5.1 | 5.7 | 5.7 | 4.8 | 5.1 | 4.8 | 5.5 | 5.8 | 4.2 | 3.9 | 5.3 | 5.5 | 5.7 | 5.0 | 4.0 | 5.2 |
| CO (bar) | 2.8 | 3.1 | 3.4 | 2.7 | 2.9 | 2.8 | 2.8 | 3.0 | 2.7 | 2.6 | 3.4 | 3.5 | 3.2 | 3.0 | 2.5 | 3.1 |
| $H_2O$ (bar) | 4.4 | 4.0 | 3.7 | 4.4 | 4.3 | 4.5 | 4.3 | 4.2 | 3.5 | 3.8 | 2.6 | 2.8 | 4.1 | 4.4 | 5.1 | 4.4 |
| $CO_2$ (bar) | 0.2 | 0.2 | 0.2 | 0.3 | 0.3 | 0.3 | 0.3 | 0.3 | 0.2 | 0.2 | 0.2 | 0.2 | 0.2 | 0.3 | 0.3 | 0.3 |
| Synthesis performance | | | | | | | | | | | | | | | | |
| % Synthesis gas conversion | 62 | 58 | 55 | 65 | 63 | 65 | 61 | 59 | 61 | 63 | 47 | 48 | 58 | 59 | 71 | 61 |
| $RIAF_{x1,i}$ | 1.0 | 1.0 | 1.0 | 1.2 | 1.1 | 1.1 | 1.0 | 0.9 | 1.0 | 1.1 | 0.7 | 0.7 | 0.9 | 1.0 | 1.2 | 1.1 |
| % C-atom $CH_4$ selectivity | 5.8 | 4.6 | 3.9 | 3.4 | 4.6 | 2.3 | 4.2 | 4.3 | 6.3 | 6.8 | 3.9 | 4.4 | 5.1 | 3.8 | 5.1 | 3.8 |
| % CO of total amount of CO converted to $CO_2$ | 1.2 | 1.6 | 1.2 | 2.0 | 1.7 | 2.1 | 2.3 | 1.5 | 2.2 | 0.8 | 0.5 | 0.6 | 1.0 | 0.5 | 2.8 | 1.2 |

| | Run number | | | | | | | |
|---|---|---|---|---|---|---|---|---|
| | 38# | 15£ | 20£ | 61£ | 332F | 125£ | 126£ | 129£ |
| Synthesis conditions: | | | | | | | | |
| Calcined catalyst mass (g) | 12.2 | 10.6 | 10.5 | 10.9 | 19.9 | 11.8 | 13.2 | 10.3 |
| Reactor temp (° C.) | 220 | 220 | 220 | 220 | 220 | 220 | 220 | 220 |
| Reactor pressure(bar) | 20.2 | 19.9 | 19.7 | 20.2 | 20.1 | 20.0 | 20.0 | 20.1 |
| Time on stream (h) | 15.2 | 15.0 | 15.0 | 15.0 | 16.0 | 17.3 | 17.5 | 16.3 |
| Feed gas composition: | | | | | | | | |
| $H_2$(vol %) | 49.9 | 52.0 | 52.0 | 52.0 | 53.2 | 50.0 | 50.0 | 50.0 |
| CO(vol %) | 27.1 | 28.0 | 28.0 | 26.0 | 27.8 | 26.0 | 27.0 | 27.0 |
| $CO_2$ (vol %) | 0.8 | 0.5 | 0.7 | 0.8 | 0.8 | 0.6 | 0.7 | 0.8 |
| Syngas ($H_2$ + CO) space velocity ($m^3_n$/(kg cat.h) | 3.5 | 3.4 | 3.5 | 4.5 | 4.1 | 3.2 | 3.2 | 3.0 |
| Reactor partial pressures: | | | | | | | | |
| $H_2$ (bar) | 5.0 | 4.8 | 5.7 | 5.4 | 6.1 | 5.0 | 4.0 | 4.8 |
| CO (bar) | 2.9 | 2.8 | 3.3 | 2.7 | 3.2 | 3.0 | 2.4 | 3.0 |
| $H_2O$ (bar) | 4.5 | 4.8 | 4.0 | 4.1 | 4.1 | 6.0 | 5.0 | 4.7 |
| $CO_2$ (bar) | 0.3 | 0.2 | 0.2 | 0.4 | 0.2 | 0.3 | 0.3 | 0.3 |
| Synthesis performance | | | | | | | | |
| % Synthesis gas conversion | 62 | 66 | 57 | 62 | 57 | 66 | 71 | 65 |
| $RIAF_{x1,i}$ | 1.1 | 1.1 | 1.0 | 1.2 | 1.0 | 1.0 | 1.1 | 1.0 |
| % C-atom $CH_4$ selectivity | 5.1 | 4.0 | 5.0 | 6.0 | 2.3 | 6.0 | 5.5 | 5.9 |
| % CO of total amount of CO converted to $CO_2$ | 1.3 | 2.0 | 1.0 | 3.0 | 1.0 | 1.7 | 2.0 | 1.5 |

The feed gas space velocity during catalyst activation is the normal volume of reducing gas fed to the reactor per unit time and per unit mass of reducible cobalt ($m^3_n$/$kg_{Co}$.hr) during activation stage 1 and activation stage 2, where the subscript Co refers to reducible cobalt. In contrast, the feed gas space velocity during Fischer-Tropsch synthesis runs refers to the normal volume of total feed gas fed to the reactor per unit time per unit mass of the calcined catalyst.

In effecting the catalyst precursor reduction in accordance with the invention, the various phases that occur during loading of a reduction reactor in which the reduction is effected and during the heating program, which may include several hold times, to a final temperature not exceeding 600° C., preferably a final temperature not exceeding 500° C., and most preferably a final temperature not exceeding 450° C., a hold time at the final temperature, followed by cooling to the unloading temperature not exceeding 180° C. and typically about ambient temperature, are as follows:

A drying phase precedes the first activation stage. During the drying phase, the following combinations of process conditions (gas environment and temperature) are allowable: a dynamic pure hydrogen gas environment (with a preferred dewpoint $\leq 4°$ C., more preferred $\leq -30°$ C.), and a temperature slightly lower than the temperature that will typify the onset of stage 1 activation, but at the same time a temperature high enough that the drying phase (ie the quantitative removal of moisture that was adsorbed during storage and/or handling) will complete within an hour; or a dynamic inert gas, eg pure nitrogen, environment (with a preferred dewpoint $\leq 4°$ C., more preferred $\leq -30°$ C.), and a temperature high enough (but not exceeding the calcination temperature applied during the preparation of the pre-reduction catalyst precursor) that the drying phase will complete within an hour. The drying phase is considered completed by the time the delta dew point (ie dewpoint of tail gas–dewpoint of total feed gas) $\leq 2°$ C. Once the delta dewpoint during a dynamic inert gas drying step has fallen off below 2° C., the inert gas is to be replaced by pure hydrogen at a temperature slightly lower than the temperature that will typify the onset of stage 1 activation, to be followed by the application of HR1. Once the delta dewpoint during a dynamic pure hydrogen gas drying step has fallen off below 2° C., the application of HR1 can follow.

Activation stage 1 starts with the subjection of the pure pre-reduction catalyst precursor (ie the intermediate product containing all the reducible cobalt as labilized cobalt oxide in the absence of any matter that was accumulated during storage and/or handling, such as physically adsorbed moisture) to a pure hydrogen environment at SV1 with the immediate application of HR1. Activation stage 1 ends at a temperature (for a specific heating program) when all reducible cobalt has been reduced to the 2+ oxidation state. This can be determined by deconvolving a typical TPR profile obtained under the same heating program. The result of such a deconvolution is shown in FIG. 1, where T* signals the end of activation stage 1. This temperature T* will be higher than the temperature of the valley between the two peaks.

Activation stage 2: The reaching of a reduction bed temperature of T* (FIG. 1) by means of HR1 signals the start of the second reduction stage. This stage ends at a temperature not exceeding 600° C., preferably not exceeding 500° C., and most preferably not exceeding 450° C. when a desired degree of reduction with respect to reducible cobalt has been obtained. Preferably a desired degree of reduction with respect to reducible cobalt is obtained between 50% to 100%, more preferably between 60% and 80%.

A cooling phase commences directly after the completion of activation stage 2, and is also performed under a pure hydrogen environment. The reduction bed temperature is allowed to cool down to a temperature $\leq$Tc in the presence of a pure hydrogen environment. At a temperature $\leq$Tc the pure hydrogen environment could be replaced with a 100% inert environment (i.e. $H_2$ and $O_2$ free, e.g. pure $N_2$), after which the fully activated catalyst can be coated with Fischer-Tropsch synthesis reactor wax in the manner described in ZA 2000/5666 which is hence incorporated herein by reference.

FIGS. 2 and 3 were generated from the values given in Tables 1 and 2. FIG. 2 illustrates the definitions of 'undesired', 'preferred' and 'most preferred' ranges referred to hereinbefore, for allowable combinations of HR1 and SV1. FIG. 3 illustrates the definitions of 'preferred' and 'most preferred' ranges referred to hereinbefore, for allowable combinations of HR2 and SV2 for the case where HR1=1.0° C./min, and SV1=13.7$m^3_n$/(kg$_{Co}$.h). It will be appreciated that a separate graph, similar to FIG. 3, will have to be prepared for each selected set of (HR1, SV1).

From prior art in this field, it was expected that an activation process to obtain a Fischer-Tropsch cobalt supported catalyst with a high intrinsic activity would involve:
The metal precursor, after a final preparation step, typically a final calcination step; being predominantly $Co_3O_4$;
The reduction rate of $Co_3O_4$ being inhibited by the presence of water vapour; the activation conditions, such as gas space velocities and heating rates, would thus be set to ensure that water partial pressure levels remained below certain limits at all times during the activation process;
The activation (reduction) of $Co_3O_4$ to its metal state not being effected in a single event or stage but proceeding by way of a plurality, eg two, consecutive stages; and
Either pure hydrogen, or diluted hydrogen containing inert diluents such as nitrogen, being used
However, the Applicant has thus now surprisingly found that
If the metal precursor, after the final preparation step, such as a final impregnation and calcination step, and at the start of the activation process, is not $Co_3O_4$, then the teachings of the prior art on how to activate cobalt oxide precursors, consisting mainly of $Co_3O_4$, to Fischer-Tropsch cobalt supported catalysts with a high intrinsic activity, may not be applicable
The rate of reduction of the metal precursor when it is $Co_3O_4$, and the quantification of the inhibiting effect of water vapour on this rate, as known from the prior art, does not apply when the metal precursor is not $Co_3O_4$. Also, the activation conditions, eg gas space velocities and heating rates, derived for the case of $Co_3O_4$, ie to keep the water partial pressure below certain limits, does not apply when the metal precursor is not $Co_3O_4$;
During the activation process at elevated temperatures only pure hydrogen should be used; and
If the metal precursor is activated to its metal state in two or more consecutive activation stages, it is possible to drop globally set, ie applicable to all the activation stages, activation conditions in favour of locally set, ie applicable to a single activation stage, activation conditions. The particular chemical species that characterise the start and end of any specific activation stage, the rate of reduction during that stage, and the inhibiting effect of water vapour on the rate of reduction during that stage, determine the locally set activation conditions for that stage. For example, the negative effect of a buildup of water vapour on catalyst activity may be more pronounced for an earlier stage than for a later stage. Thus, the earlier stage(s) would not be able to tolerate as low space velocities (eg to reduce hydrogen pump around) and as high heating rates (eg to reduce the overall reduction time) as the later stage(s), and still keep the water partial pressure during these stage in check. In other words, in the process according to the invention for producing a Fischer-Tropsch synthesis catalyst, more water will be produced per reducible cobalt atom (be it from the reduction of nitrates, from the reduction of carbonates, and/or from the reduction of cobalt oxides of higher oxidation state to a cobalt (II) oxide) than what can be expected of $Co_3O_4$, during the first activation stage.
The rate of production of water is higher (possibly because the preferred labilized cobalt oxide phase(s) is more porous) than for the case of $Co_3O_4$, for the first stage of activation;
This means that the control over water partial pressure is considered to be more challenging during the first activation stage (compared to the case for $Co_3O_4$), than during the second activation stage, necessitating lower heating rates/higher space velocities during the first activation stage.

The Inventors have thus developed an activation procedure for supported cobalt catalysts, resulting in excellent Fischer-Tropsch synthesis behaviour. It was surprisingly found that the activation of supported cobalt catalyst precursors, wherein all the reducible cobalt can be represented by a formula unit that contains more than 4/3 moles of oxygen atoms per mole of cobalt atoms (e.g. $CoO_aH_b$ where $a \geq 1.7$ and $b>0$ as disclosed in WO 01/39882A1, or monometal hydrotalcite-like compounds of $Co^{ii}_{0.74} Co^{iii}_{0.26} (OH)_{2.01}$ $(NO_3)_{0.21} (CO_3)_{0.02}$ 0.6 $H_2O$ and $Co^{ii}_{0.74} Co^{iii}_{0.26} (OH)_{1.99}$ $(CO_3)_{0.13} (NO_3)_{0.01}$ 0.7 $H_2O$ as described in: Chem. Matter.; 2000; 12; 3459-3465), can be performed in a 2 stage activation procedure, in which the second activation step has a higher heating rate and/or a lower feed gas space velocity.

The invention claimed is:

1. A process for producing a supported Fischer-Tropsch catalyst, which process comprises the steps of:
   (a) treating, in a first activation stage, a particulate pre-reduction cobalt supported Fischer-Tropsch synthesis catalyst precursor, which comprises a catalyst support impregnated with cobalt and containing reducible labilized cobalt oxide which is in a calcined state and which has a formula-unit in which each mole of cobalt atoms is associated with more than 4/3 moles of oxygen atoms and displays a reducible cobalt oxide specific surface area at least equal to that of $Co_3O_4$ spinel, with a pure hydrogen reducing gas, at a first specific feed gas space velocity, SV1, and at a first heating rate, HR1, to obtain a partially reduced catalyst precursor; and
   (b) thereafter treating the partially reduced catalyst precursor, in a second activation stage, with a pure hydrogen reducing gas, at a second specific feed gas space velocity, SV2, and at a second heating rate, HR2, to obtain an activated supported Fischer-Tropsch catalyst, wherein $SV2 \leq SV1$ and $HR2 \geq HR1$, provided that when SV2=SV1, HR2≠HR1 and when HR2=HR1, SV2≠SV1.

2. A process according to claim 1, wherein the labilized cobalt oxide is selected from the formula-units comprising $CoO_aH_b$, where $a \geq 1.7$ and $b>0$, and monometal hydrotalcite-like compounds of $Co^{ii}_{0.74} Co^{iii}_{0.26} (OH)_{2.01} (NO_3)_{0.21}$ $(CO_3)_{0.02}$ 0.6 $H_2O$ and $Co^{ii}_{0.74} Co^{iii}_{0.26} (OH)_{1.99} (CO_3)_{0.13}$ $(NO_3)_{0.01}$ 0.7 $H_2O$.

3. A process according to claim 1, wherein the treatments in the first and second activation stages are effected by using a fluidized bed of the catalyst precursor, with the reducing gas acting as a fluidizing medium for fluidizing the bed of particles.

4. A process according to claim 1, wherein (i) a constant space velocity is maintained during the treatment in the first activation stage so that SV1 is constant, and (ii) a constant space velocity is maintained during the treatment in the second activation stage so that SV2 is constant, with $SV2 \leq SV1$.

5. A process according to claim 4, wherein (i) a constant heating rate is maintained during the treatment in the first activation stage so that HR1 is constant, and (ii) a constant heating rate is maintained during the treatment in the second activation stage so that HR2 is constant, with $HR2 \geq HR1$.

6. A process according to claim 4, wherein the catalyst has an initial Relative Intrinsic Fischer-Tropsch synthesis Activity Factor $RIAF_{x,i}$ of at least 0.8, with $RAIF_{x,i}$ being defined as: the Relative Intrinsic Fischer-Tropsch synthesis Activity Factor ($RIAF_x$) at 16.5±1.5 hours on stream slurry phase CSTR Fischer-Tropsch synthesis performance under realistic conditions, where realistic slurry phase CSTR Fischer-Tropsch synthesis conditions are:

Reactor temperature: 220.0±0.5° C.
   Reactor pressure: 20.5±0.7 bar
   % ($H_2$+CO) conversion conversion: 60+13
   Feed gas composition:
   $H_2$: about (ca.) 50 vol %
   CO: ca. 25 vol %
   Balance: Ar, $N_2$, $CH_4$, and/or $CO_2$, with $$RIAF_x = [A_x/A_{x,b}]$$

where
   a) $A_x$ is the Arrhenius pre-exponential factor of catalyst precursor X,
      activated to an arbitrary reduction procedure:
   b) $A_{x,b}$ is the Arrhenius pre-exponential factor of catalyst precursor X,
      estimated from 15 hours on stream slurry-phase Continuous Stirred Tank Reactor (CSTR) Fischer-Tropsch synthesis performance under realistic conditions, and having utilized the following benchmark reduction procedure:
      Fixed bed, of 20 mm internal diameter, reduction of 15±5 g catalyst precursor X at atmospheric pressure utilizing an undiluted $H_2$ reducing gas at a purity of 5.0 as total feed at a space velocity of 1300 $ml_n$ per gram reducible cobalt per hour, whilst applying the following temperature program: heat from 25° C. to 425° C. at 1° C./min, and hold isothermally at 425° C. for 16 hours;
   c) the pre-exponential factor A, which is applicable to both $A_x$ and $A_{x,b}$, is defined from the generally accepted cobalt-based Fischer-Tropsch empirical kinetic expression:

$$r_{FT} = [Ae^{(-Ea/RT)} P_{H2} P_{CO}]/[1+KP_{co}]^2 \text{ or}$$

$$A + [r_{FT}(1+KP_{co})^2]/[e^{(-Ea/RT)} P_{H2} P_{co}]$$

where:
   $r_{FT}$ is expressed in terms of the number of moles of CO converted into Fischer-Tropsch synthesis products per unit time per unit mass of the catalyst precursor in its pre-reduction state.

7. A process according to claim 4, wherein $RIAF_{x,i}$ for the catalyst is greater than 1.0.

8. A process according to claim 4, wherein the first activation stage commences at the same temperature as the onset of reduction of the reducible cobalt, when the production of water is for the first time accompanied by the consumption of hydrogen, with the first activation stage treatment being continued until all of the reducible cobalt has been converted quantitatively to CoO at a bed temperature which has a value in the range of 150° C. to 280° C., so that, at the commencement of the second activation stage treatment, the temperature in the second activation stage is at said value in the range 150° C. to 280° C., and with the second activation stage treatment being continued until the temperature in the second treatment stage has a value in the range of 300° C. to 600° C.

9. A process according to claim 1, wherein the feed gas space velocities during the treatments in the first and/or second activation stages are non-constant or variable.

10. A process according to claim 9, wherein $RIAF_{x,i}$ for the catalyst is at least 0.8.

11. A process according to claim 9, wherein $RIAF_{x,i}$ for the catalyst is greater than 1.0.

12. A process according to claim 1, wherein the pure hydrogen reducing gas which is used in the first and the second activation stages is a hydrogen containing gas mixture comprising $\geq 90$ vol % $H_2$ and $\leq 10$ vol % inerts, with the dewpoint of the pure hydrogen reducing gas being <4° C.

13. A process according to claim 1, wherein the treatments in both the first and second activation stages are effected at between 0.6 and 1.5 bar(a).

* * * * *